(12) United States Patent
Ando et al.

(10) Patent No.: US 7,504,146 B2
(45) Date of Patent: Mar. 17, 2009

(54) HEXAGONAL CELL HONEYCOMB STRUCTURE BODY

(75) Inventors: Yoshiyasu Ando, Kakamigahara (JP);
Toshiharu Kondo, Toyoake (JP);
Tatsuji Mizuno, Nagoya (JP)

(73) Assignees: Denso Corporation, Kariya (JP);
Toyota Jidosha Kabushiki Kaisha, Toyota-shi (JP)

( * ) Notice: Subject to any disclaimer, the term of this patent is extended or adjusted under 35 U.S.C. 154(b) by 70 days.

(21) Appl. No.: 11/641,888

(22) Filed: Dec. 20, 2006

(65) Prior Publication Data

US 2007/0148406 A1    Jun. 28, 2007

(30) Foreign Application Priority Data

Dec. 27, 2005    (JP) ............... 2005-374275

(51) Int. Cl.
*B32B 3/12* (2006.01)
(52) U.S. Cl. ............. 428/116; 428/117; 428/118
(58) Field of Classification Search .......... 428/116, 428/117, 314.2, 316.6, 304.4; 422/177, 180, 422/211, 222; 55/523; 502/407, 414, 415
See application file for complete search history.

(56) References Cited

U.S. PATENT DOCUMENTS 5,714,228 A * 2/1998 Beckmeyer et al. ......... 428/118
6,713,429 B1 * 3/2004 Tanaka et al. .............. 502/100
6,890,616 B2   5/2005 Suwabe et al.
2002/0042344 A1   4/2002 Kondo et al.

FOREIGN PATENT DOCUMENTS

| JP | 51-20435 | 6/1976 |
| JP | 2000-237602 | 9/2000 |
| JP | 2002-177794 | 6/2002 |
| JP | 2003-269131 | 9/2003 |

* cited by examiner

*Primary Examiner*—Timothy M Speer
*Assistant Examiner*—Gordon R Baldwin
(74) *Attorney, Agent, or Firm*—Nixon & Vanderhye PC

(57) ABSTRACT

A hexagonal cell honeycomb structure body has a plurality of hexagonal cells. Each hexagonal cell is surrounded by six cell walls in a hexagonal lattice shape. A R-shaped corner part of an approximate circular-arc shape is alternately formed at interior angle parts of the six cell walls forming each hexagonal cell. The three R-shaped corner parts are at the alternate internal corners of each hexagonal cell observed from a cross section of the axis direction of the hexagonal cell honeycomb structure body. A radius of curvature of each R-shaped corner part is larger than that of the interior corner part having no R-shaped corner part. The minimum radius of curvature of the R-shaped corner part is 2.8 to 5 times of a thickness of each hexagonal cell wall, namely within a range of 0.25 mm to 0.45 mm.

7 Claims, 4 Drawing Sheets

HEXAGONAL CELL HONEYCOMB STRUCTURE BODY

CROSS-REFERENCE TO RELATED APPLICATIONS

This application is related to and claims priority from Japanese Patent Application No. 2005-374275 filed on Dec. 27, 2005, the contents of which are hereby incorporated by reference.

BACKGROUND OF THE INVENTION

1. Field of the Invention

The present invention relates to a honeycomb structure body having a plurality of hexagonal cells formed in a lattice arrangement, and in particular, relates to a honeycomb structure body having a plurality of hexagonal cells in which each hexagonal cell is surrounded by a hexagonal cross-section cell wall composed of six sides. Through the following description, such a honeycomb structure body having a plurality of hexagonal cells will be referred to as "a hexagonal cell honeycomb structure body".

2. Description of the Related Art

Honeycomb structure bodies have been known as a substrate or a base material for purifying exhaust gas emitted from an internal combustion engine mounted on a vehicle such as diesel engine vehicles and gasoline engine vehicles. The honeycomb structure body has a plurality of cells formed in a lattice arrangement. Each cell is surrounded by cell walls. The honeycomb structure body is mainly made of cordierite of a superior thermal-shock resistance. Catalyst is uniformly supported on the surfaces of the cell walls. That is, the entire surfaces of the cell walls are coated with catalyst. Japanese patent laid open publication No. JP 2002-177794 has disclosed a honeycomb structure body having such a configuration.

The ceramic honeycomb structure body is composed of plural cells and the shape of each cell is triangle, square, or hexagon, for example. A hexagonal cell honeycomb structure body, namely, a honeycomb structure body composed of a plurality of hexagonal cells is capable of easily and uniformly supporting catalyst on the surfaces of the cell walls and capable of reducing pressure loss when compared with a honeycomb structure body of another type composed of triangle cells or square cells. In addition, because each hexagonal cell formed in the hexagonal cell honeycomb structure body is capable of suppressing the formation of excess amount of catalyst on the surfaces of the cell walls, the entire weight of the hexagonal cell honeycomb structure body can be reduced. Considering from the capability of purifying exhaust gas, the hexagonal cell honeycomb structure body has become of major interest, recently. This has been disclosed in Japanese patent laid open publication No. JP 2000-237602.

As described above, although the hexagonal cell honeycomb structure body has a superior function of efficiently purifying exhaust gas emitted from an internal combustion engine of a vehicle, the entire strength thereof is relatively low. In particular, when the hexagonal cell honeycomb structure body does not entirely have a sufficient strength under the use as an exhaust gas purifying substrate, there is a possibility of causing cracks and breaking in the hexagonal cells by vibration and stress generated during a caning step of forcedly caning the hexagonal cell honeycomb structure body into an exhaust gas pipe, and during an assembling step of assembling it into a vehicle.

There is a conventional manner of solving such a drawback, which forms thicker cell walls for the hexagonal cells in order to increase and improve the entire strength of the hexagonal cell honeycomb structure body. This manner however increases the entire weight of the hexagonal cell honeycomb structure body and cannot achieve the recent commercial demand of making a vehicle light and small. In addition, a heavy hexagonal cell honeycomb structure body decrease the function of rapidly warming catalyst supported on the surfaces of cell walls in the hexagonal cells prevents rapid warming. This involves a possibility of reducing the purifying capability of purifying exhaust gas.

Accordingly, the hexagonal cell honeycomb structure body is being asked to increasing the entire strength thereof while maintaining the adequate strength in practical use.

SUMMARY OF THE INVENTION

The present invention is designed to address the above mentioned conventional objects and prior art deficiencies. It is an object of the present invention to provide a hexagonal cell honeycomb structure body having a plurality of hexagonal cells capable of increasing the entire strength of the hexagonal cell honeycomb structure body without decreasing its intrinsic function for purifying exhaust gas. To achieve the above objects, the present invention provides a hexagonal cell honeycomb structure body having a plurality of hexagonal cells formed in a lattice arrangement. Each hexagonal cell is surrounded by cell walls composed of six sides arranged in a hexagonal lattice shape. In the hexagonal cell honeycomb structure body, a R-shaped corner part of an approximate circular-arc shape is alternately formed at interior angle parts of the cell walls forming each hexagonal cell in view of a cross section of the hexagonal cell perpendicular to an axis direction of the hexagonal cell honeycomb structure body, and a radius of curvature of each R-shaped corner part is larger than a radius of curvature of another corner part at which the R-shaped corner part is not formed.

In the hexagonal cell honeycomb structure body according to the present invention, each hexagonal cell is formed or surrounded by the cell walls formed in a hexagonal lattice arrangement. Accordingly, each hexagonal cell has the six interior angle parts. The most important feature of the hexagonal cell honeycomb structure body according to the present invention is that the R-shaped corner parts of an approximate circular-arc shape are formed at the interior angle parts in view of the cross section of the hexagonal cell honeycomb structure body perpendicular to the axis direction thereof. The interior angle parts having the R-shaped corner part are alternately formed, namely arranged adjacent to the interior angle parts having no R-shaped corner part. In addition, the radius of curvature of each R-shaped corner part is larger than the radius of curvature of the interior angle part having no R-shaped corner part in each hexagonal cell.

That is, the R-shaped corner part is alternately formed at the three interior parts in the six interior parts in each hexagonal cell. By alternately forming the R-shaped corner parts in each hexagonal cell, it is possible to increase the entire strength of the hexagonal cell honeycomb structure body while keeping a sufficient strength required for practical use such as an exhaust gas purifying substrate.

In particular, under the cases applied to an exhaust gas purifying substrate for purifying exhaust gas emitted from an internal combustion engine of a vehicle, it is possible to avoid the occurrence of cracks and breaking the hexagonal cell honeycomb structure body by vibration and stress that are generated during the caning step in which the hexagonal cell honeycomb structure body is forcedly canned into an exhaust gas pipe mounted on a vehicle and the assembling step of assembling it into the vehicle.

Further, because the R-shaped corner part is alternately formed only at the three interior angle parts in the six interior angle parts in each hexagonal cell, it is possible to suppress drastic increasing of the entire weight of the hexagonal cell honeycomb structure body when compared with a related art having the cell wall of an increased thickness.

Furthermore, because there is no change of the basic construction, weight, and volume of the hexagonal cell honeycomb structure body having the R-shaped corner part, it is possible to maintain the intrinsic performance such as purifying exhaust gas and rapidly warning catalyst coated with and supported on the surfaces of the cell wall (as a catalyst rapid warning capability), for example.

Still furthermore, according to the present invention, the R-shaped corner part is formed at the three interior angle part of each hexagonal cell, namely, each hexagonal cell has the three R-shaped corner parts which are alternately formed at the interior angle parts. In other words, the three R-shaped corner parts are not continuously arranged in each hexagonal cell. This configuration provides a uniform hexagonal cell honeycomb structure body with a high precision without causing any eccentric shape of the raw material when compared with following various cases (a), (b), and (c):

(a) The R-shaped corner parts of more than three are formed at continuous interior angle parts, for example, the first, second fourth, fifth, and sixth interior angle parts in each hexagonal cell;

(b) The R-shaped corner parts are formed at a symmetry between the upper and lower parts or the right and left sides in each hexagonal cell, and (c) The R-shaped corner parts are formed only at one side in each hexagonal cell.

It is thereby possible to prevent any occurrence of deformation in the hexagonal cell honeycomb structure body after molding in manufacturing.

BRIEF DESCRIPTION OF THE DRAWINGS

A preferred, non-limiting embodiment of the present invention will be described by way of example with reference to the accompanying drawings, in which.

DETAILED DESCRIPTION OF THE PREFERRED EMBODIMENTS

Figure 1:
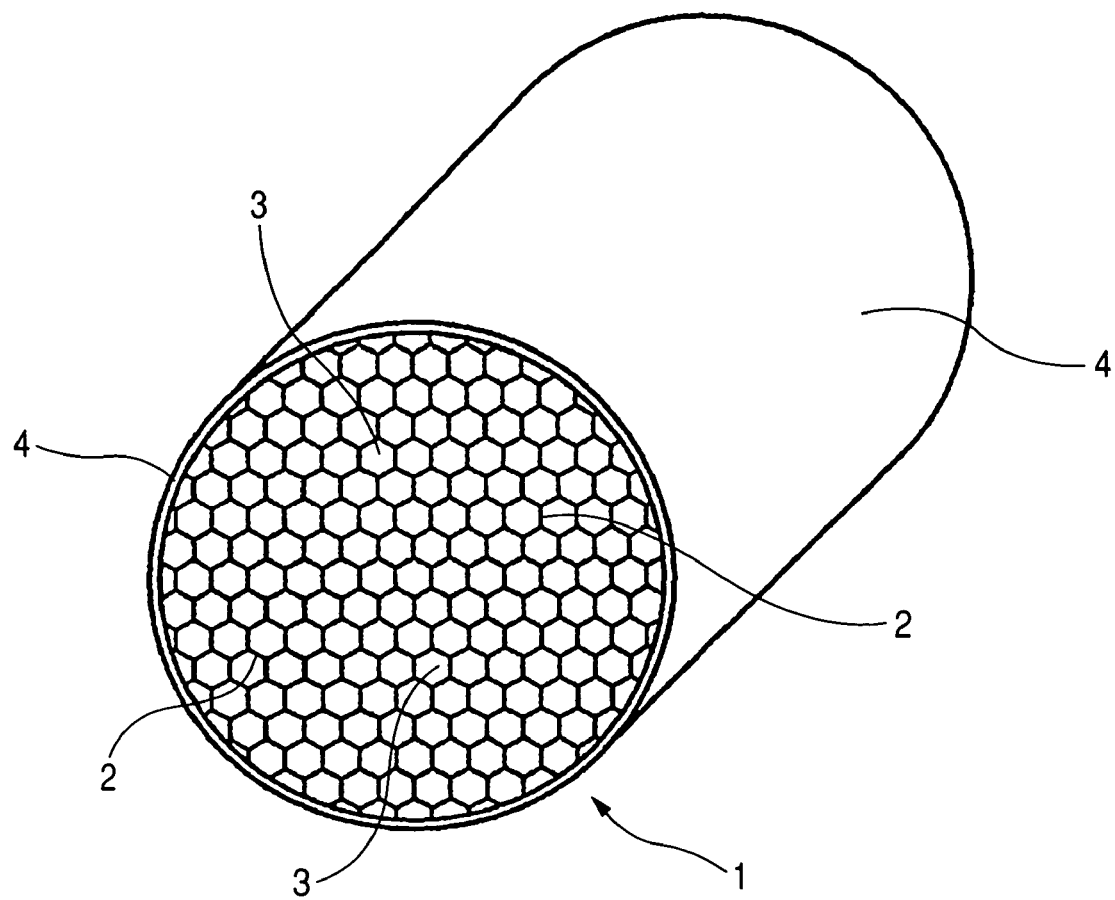
FIG. 1 is a perspective view of a hexagonal cell honeycomb structure body having a plurality of hexagonal cells according to a preferred embodiment of the present invention.

Hereinafter, various embodiments of the present invention will be described with reference to the accompanying drawings. In the following description of the various embodiments, like reference characters or numerals designate like or equivalent component parts throughout the several diagrams.

Preferred Embodiment

A description will be given of a hexagonal cell honeycomb structure body having a plurality of hexagonal cells according to the preferred embodiment of the present invention with reference to FIG. 1 to FIG. 5.

Figure 2:
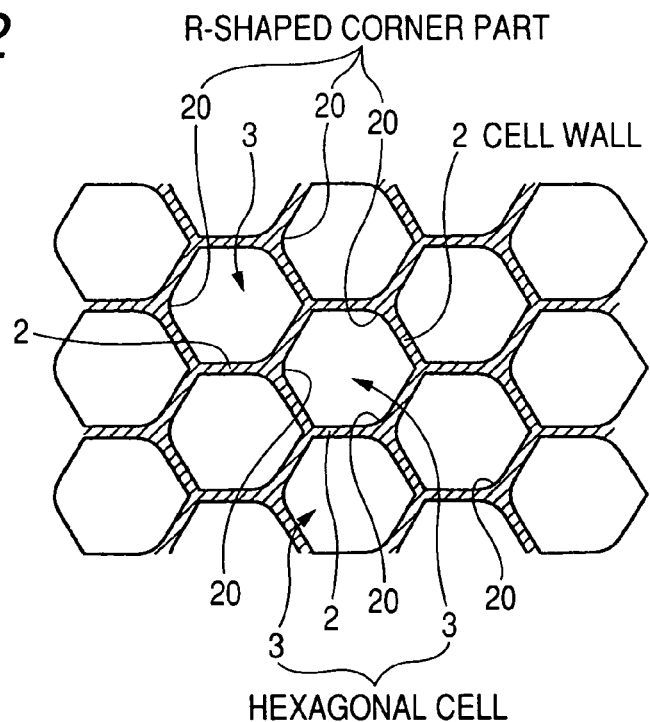
FIG. 2 is a view showing the honeycomb shape of the cell walls that form the hexagonal cells having a R-shaped corner part in the hexagonal cell honeycomb structure body according to the preferred embodiment shown in FIG. 1.

FIG. 1 is a perspective view of the hexagonal cell honeycomb structure body 1 having a plurality of hexagonal cells according to the preferred embodiment of the present invention. FIG. 2 is a view showing the shape of cell walls 3 forming each hexagonal cell 3 having three R-shaped corner parts in the hexagonal cell honeycomb structure body 1 of the embodiment shown in FIG. 1.

Figure 3:
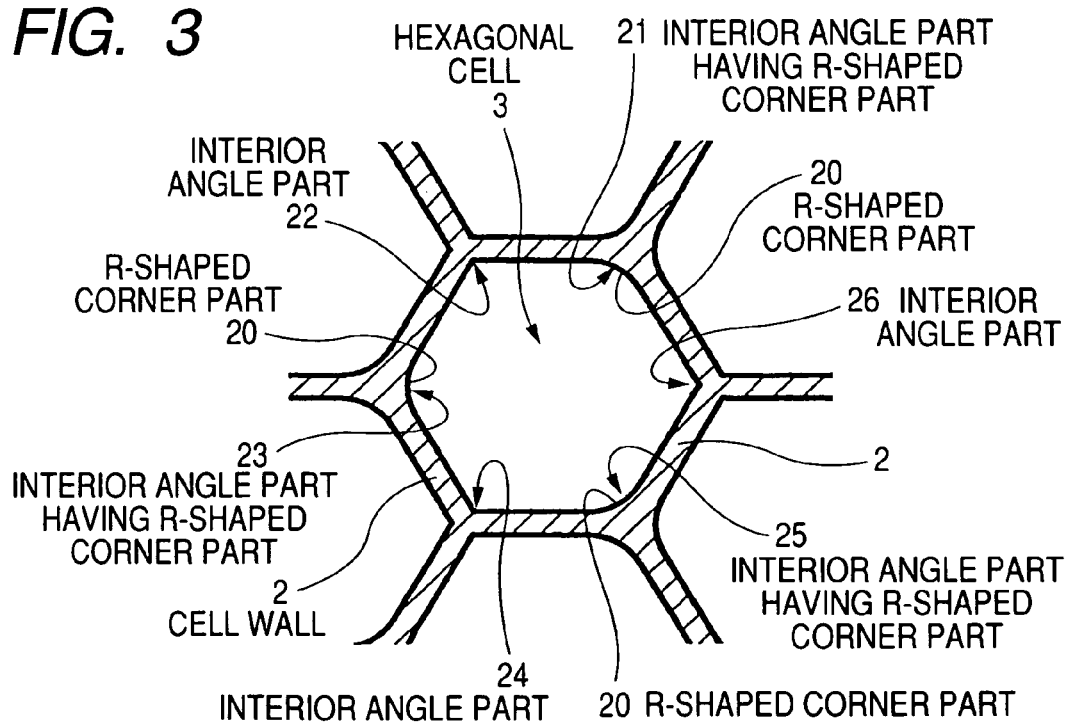
FIG. 3 is a view showing a detailed shape of the cell walls as partition walls having the R-shaped corner in each hexagonal cell ofn the honeycomb structure body according to the preferred embodiment.

FIG. 3 is a view showing a detailed shape of the cell walls 2 as partition walls having the three R-shaped corners forming each hexagonal cell 2 in the hexagonal cell honeycomb structure body 1 according to the embodiment shown in FIG. 1 and FIG. 2.

As shown in FIG. 1, the hexagonal cell honeycomb structure body 1 has a plurality of the hexagonal cells 3. Each hexagonal cell 3 of a hexagonal shape is surrounded by the six cell walls 2 formed in a hexagonal lattice arrangement. As shown in FIG. 3, the three R-shaped corner parts 20 are alternately formed at the internal angle parts 21, 23, and 25 in the six internal angle parts 21 to 26 in the cell walls 2 that form each hexagonal cell 3. In other words, the three R-shaped corner parts 20 are formed at the alternate internal corners of each hexagonal cell 3. Each hexagonal cell 3 has three R-shaped corner parts 20 which are alternately formed at the internal angle parts thereof.

In a cross section perpendicular to the axis direction of the hexagonal cell honeycomb structure body 1, the three R-shaped corner parts 20 having an approximate circular-arc shape are alternately formed, namely, formed at the internal angle parts 21, 23, and 25. The radius of curvature of each R-shaped corner part 20 is larger than that of the interior angle parts 22, 24, and 26 having no R-shaped corner part in each hexagonal cell 3. The interior angle parts 21, 23, and 25 are arranged adjacent to the interior angle parts 22, 24, and 26, respectively.

The hexagonal cell honeycomb structure body 1 of the embodiment shown in FIG. 1 can be applied to an exhaust gas purifying substrate or filter for purifying exhaust gas emitted from an internal combustion engine of a vehicle such as diesel engine vehicles and gasoline engine vehicles.

As shown in FIG. 1, the outer periphery of the hexagonal cell honeycomb structure body 1 is covered with an outer peripheral skin part 4 of a cylindrical shape. The inner part of the hexagonal cell honeycomb structure body 1 is composed of the cell walls 2 and the hexagonal cells 3. The cell walls 2 are placed in a hexagonal lattice structure or arrangement in order to surround the hexagonal cells 3 arranged in a lattice shape (or in a honeycomb structure shape).

The hexagonal cell honeycomb structure body 1 is made of ceramic composed mainly of cordierite. The outer diameter of the hexagonal cell honeycomb structure body 1 is approximately 90.0 mm, and the length thereof is approximately 120.0 mm. The thickness of the outer peripheral skin part 4 thereof is 300 µm, and the thickness of the cell wall 2 is 90 µm. In particular, FIG. 1 shows each hexagonal cell 3 of a simple hexagonal shape.

As shown in FIG. 2, the cell walls 2 forming each hexagonal cell 3 are arranged in a hexagonal lattice configuration observed from a cross section perpendicular to the axis direction of the hexagonal cell honeycomb structure body 1. The important feature of the hexagonal cell honeycomb structure body 1 according to the embodiment of the present invention is that the R-shaped corner part 20 of an approximate circular-arc shape is formed at each of the internal corners 21, 23, 25 of the cell walls 2.

A description will now be given of the detailed explanation of the R-shapes corner part 20.

As shown in FIG. 3, the cell walls 2 forming each hexagonal cell 3 (namely, a unit cell 3) have the six internal angle parts 21 to 26 at the inner corner parts of the hexagonal cell 3. The R-shaped corner part 20 is formed at each of the internal angle parts 21, 23, and 25.

As shown in FIG. 3, the R-shaped corner part 20 has an approximate circular-arc shape of a specified radius of curvature. In particular, the radius of curvature of the R-shaped corner part 20 is larger than that of each of the internal angle parts 22, 24, and 26 having no R-shaped corner part. The radius of curvature of the R-shaped corner part 20 is constant through the hexagonal cells 2 in the hexagonal cell honeycomb structure body 1 of the embodiment. The length of the radius of curvature of the R-shaped corner part 20 is 0.3 mm that is three times of the thickness of each cell wall 2. That is, the minimum radius of curvature of the R-shaped cornet part 20 is 0.3 mm.

However, the present invention is not limited by the configuration, for example, it is possible to keep constant the radius of curvature of the R-shaped corner part 20 or also possible to change it in steps.

Next, a description will now be given of a manufacturing method of producing the hexagonal cell honeycomb structure body 1 of the embodiment with reference to FIG. 4.

Figure 4:
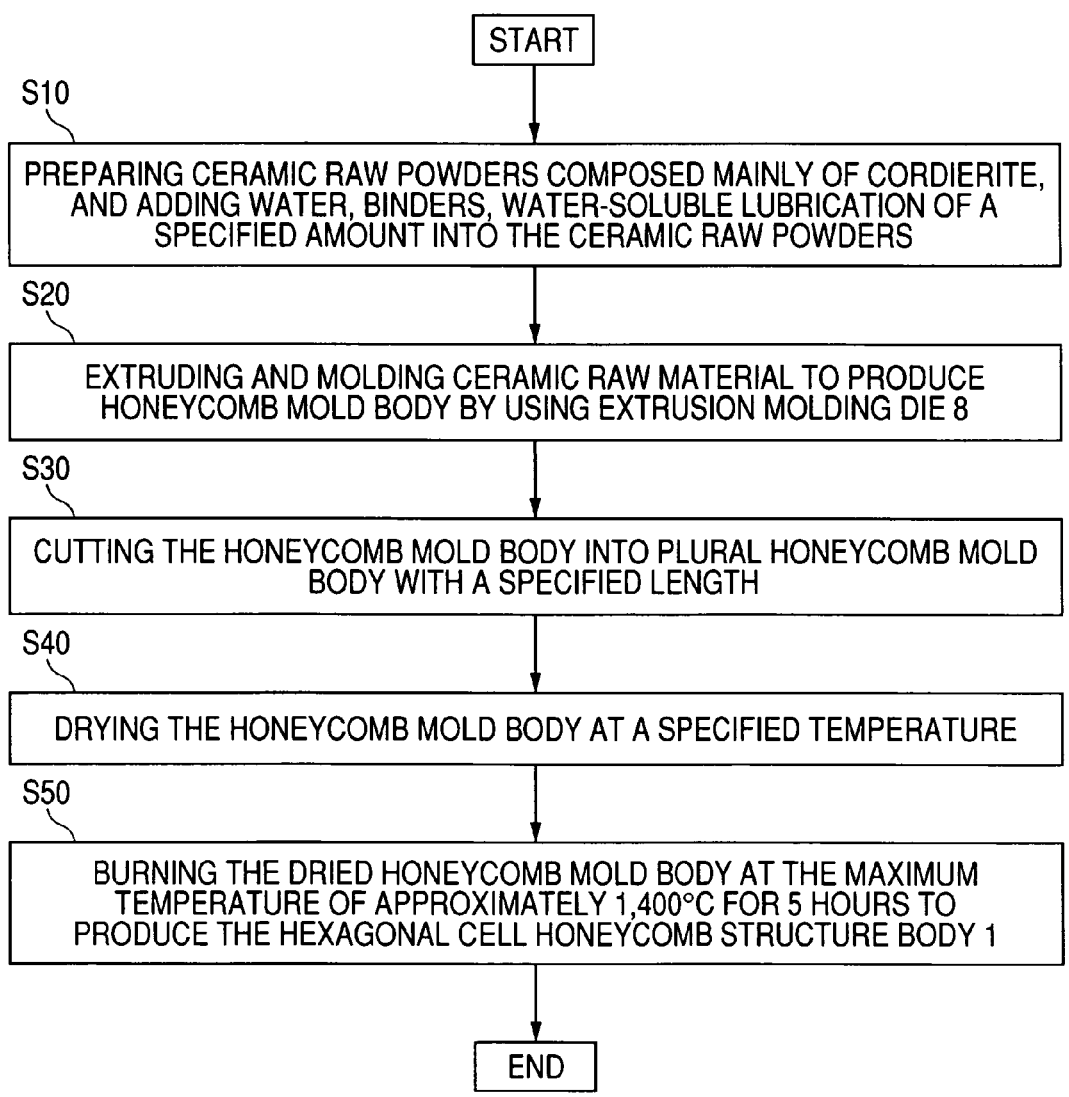
FIG. 4 is a flowchart showing a manufacturing method of producing the hexagonal cell honeycomb structure body according to the preferred embodiment shown in FIG. 1.

FIG. 4 is a flowchart showing the manufacturing method of producing the hexagonal cell honeycomb structure body 1 according to the embodiment shown in FIG. 1.

At first, ceramic raw powders are firstly prepared (Step S10), which are composed mainly of cordierite ($2MgO.2Al_2O_3.5SiO_2$) including kaolin, talc, alumina, aluminum hydroxide, carbon, fused silica, and the like. The final chemical composition of the cordierite is 48.0 to 52.0 wt % of $SiO_2$, 34.0 to 38.0 wt % of $Al_2O_3$, and 12.0 to 16.0 wt % of MgO. Water, binders, and water-soluble lubricant of a specified volume are then added into those ceramic raw powders, and then mixed. The viscosity of mixed ceramic raw powders has been adjusted within a range of 2,500 to 8,000 poises.

A molding die 8 is used in the extrusion molding step of performing extrusion and molding of the ceramic raw material.

Figure 5:
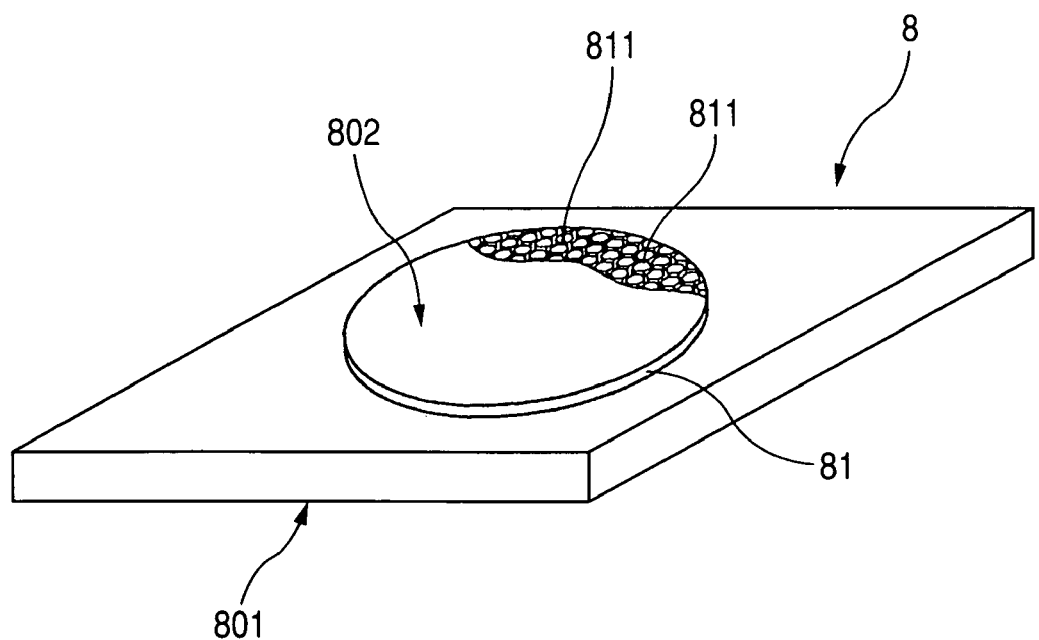
FIG. 5 is a perspective view of a molding die for use in the manufacturing of the hexagonal cell honeycomb structure body of the embodiment.

FIG. 5 is a perspective view of the extrusion molding die 8 with which the honeycomb structure body of the embodiment is manufactured. As shown in FIG. 5, the extrusion molding die 8 for use of producing the hexagonal cell honeycomb structure body 1 consists of a supply surface 801 and an extruding surface 802. The ceramic raw material is supplied from the supply surface 801 side and the ceramic raw material is extruded through the extruding surface 802 side. A groove forming part 81 is formed on the extruding surface 802 side. The groove forming part 81 protrudes from the area around the extruding surface 802.

Plural slit grooves 811 are formed in the extruding surface 802. Those slit grooves 811 correspond to the entire shape (see FIG, 2 and FIG. 3) of the cell walls 2 of the hexagonal cell honeycomb structure body 1 to be manufactured. The plural slit grooves 811 in the extrusion molding die 8 can be formed by electric discharge machining (EDM) or laser beam machining.

A supply hole (omitted from the drawings) is formed in the supplying surface 801 of the molding die 8. The ceramic raw material is supplied through the supply hole (not shown). The supply hole and the slit grooves 811 are joined to each other in the inside of the extrusion molding die 8.

At step S20, the ceramic raw material is supplied through the supplying surface 801 and extruded from the extruding surface 802 through the plural slit grooves 811. As a result, a honeycomb mold body is molded through the extrusion molding die 8. The produced honeycomb mold body (omitted from the drawings) corresponds to the hexagonal cell honeycomb structure body 1 that would be finally manufactured, as shown in FIG. 1.

Next, at Step S30, the honeycomb mold body is cut into plural mold bodies of a specified length.

At Step S40, the mold body is then dried uniformly at a specified temperature by electromagnetic heating.

Finally, at Step S50, the dried mold body is heated at approximately 1,400° C. for maximum five hours. The manufacturing method of producing the hexagonal cell honeycomb structure body 1 shown in FIG. 1 is thereby completed.

(Action and Effect)

A description will now be given of action and effects of the hexagonal cell honeycomb structure body 1 of the embodiment according to the present invention.

In the hexagonal cell honeycomb structure body 1, each hexagonal cell 3 is surrounded by the cell walls 2 that are placed or formed in a hexagonal lattice arrangement. Accordingly, each hexagonal cell 3 has the six interior angle parts 21 to 26. The most important feature of the hexagonal cell honeycomb structure body 1 is that the R-shaped corner parts 20 of an approximate circular-arc shape are formed at the interior angle parts 21, 23, and 25 in view of the cross section perpendicular to the axis direction of the hexagonal cell honeycomb structure body 1, and the interior angle parts 21, 23, and 25 are arranged adjacent to the interior angle parts 22, 24, and 26 having no R-shaped corner part, respectively. In addition, the radius of curvature of each R-shaped corner part 20 is larger than that of the interior angle parts 22, 24, and 26 in the hexagonal cell 3.

That is, in each hexagonal cell 3 of the hexagonal cell honeycomb structure body 1 of the embodiment, the R-shaped corner part 20 of an approximate circular-arc shape is formed or placed at the three corner parts 21, 23, and 25, which are positively placed alternately in the sixth corner parts 21 to 26. Further, the specified radius of curvature of the R-shaped corner part 20 is at least greater than that of the adjacent corner parts 22, 24, and 26. The formation of the R-shaped corner part 20 in each hexagonal cell 3 can increase the entire strength of the hexagonal cell honeycomb structure body 1 of the embodiment while maintaining the sufficient strength under the use as an exhaust gas purifying substrate.

In particular, under the application to an exhaust gas purifying substrate for purifying exhaust gas emitted from an internal combustion engine of a vehicle, it is possible to avoid the occurrence of cracks and breaking the hexagonal cell honeycomb structure body 1 by vibration and stress generated during a caning step of forcedly caning the hexagonal cell honeycomb structure body 1 into an exhaust gas pipe and an assembling step of assembling it into a vehicle.

Further, because the R-shaped corner part 20 of the radius of curvature of approximately 0.3 mm is formed only at the three interior angle parts 21, 23, and 25, alternately in the six interior angle parts in each hexagonal cell 3, it is possible to suppress the drastic increase of the entire weight of the hexagonal cell honeycomb structure body 1 of the embodiment when compared with a related art of increasing the thickness of each cell wall.

Furthermore, because there is no change in basic construction, weight, and volume of the hexagonal cell honeycomb structure body 1 having the R-shaped corner part 20, it is possible to maintain the intrinsic performance such as the capability of purifying exhaust gas and the capability of rapidly warning catalyst supported on the surfaces of the cell wall 2 (as a catalyst rapid warning capability), for example.

Still furthermore, the thickness of each cell wall 2 is 90 μm. This thickness is capable of adequately maintaining the strength of the hexagonal cell honeycomb structure body 1 of the embodiment.

Further, the minimum radius of curvature of the R-shaped corner part 20 in each hexagonal cell 3 is 0.3 mm that is three times of the thickness of the cell wall 2. This configuration adequately increases the entire strength of the hexagonal cell honeycomb structure body 1 of the embodiment, and in addition, certainly maintains its intrinsic capability of purifying exhaust gas.

As described above, the embodiment of the present invention can provide the hexagonal cell honeycomb structure body 1 of the superior function to increase its entire strength while maintaining the intrinsic capability of purifying exhaust gas.

(Experimental Result)

A description will now be given of the experimental results of varying the minimum radius of curvature of the R-shaped corner part 20 in each hexagonal cell of the hexagonal cell honeycomb structure body 1 with reference to FIG. 6.

Figure 6:
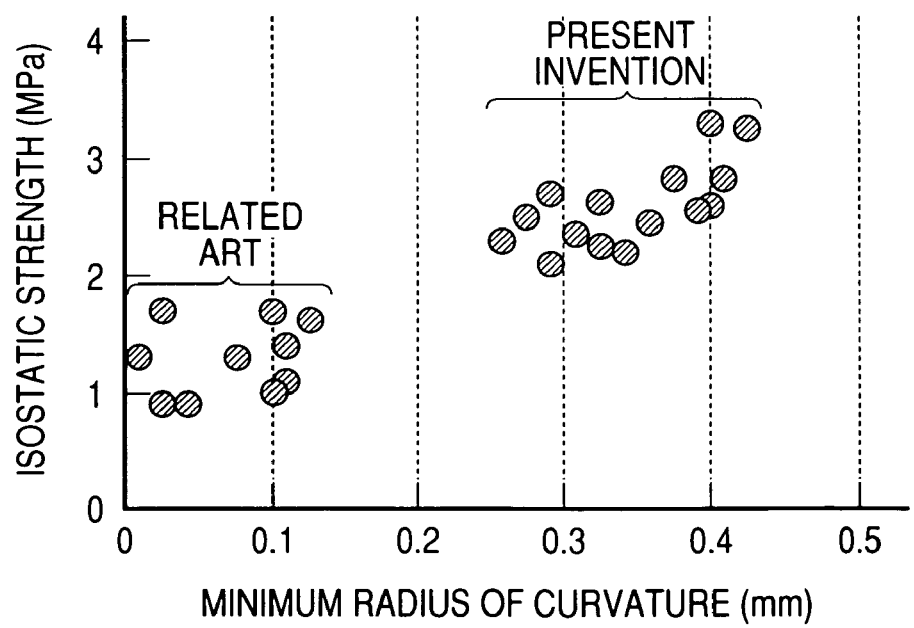
FIG. 6 shows experimental results of measuring Isostatic strength (MPa) of the hexagonal cell honeycomb structure body according to the embodiment while changing the minimum radius of curvature within a range of 0 to 5.0 mm.

FIG. 6 shows experimental results of measuring Isostatic strength (MPa) of the hexagonal cell honeycomb structure body 1 according to the embodiment while changing the minimum radius of curvature (mm) in a range of 0 to 0.5 mm.

The experiments has measured the isostatic strength (MPa) of each of the hexagonal cell honeycomb structure body 1 of the embodiment while changing the minimum radius of curvature of the R-shaped corner part 20 within a range of 0 to 0.5 mm.

The measuring manner of measuring the isostatic strength (MPa) of the hexagonal cell honeycomb structure body 1 is as follows.

First, both of the end surfaces of the hexagonal cell honeycomb structure body 1 are sealed by metal plates. The outer peripheral surface of the hexagonal cell honeycomb structure body 1 is covered with a thicker film resin and then sealed so as to completely keep the water-proofing or moisture-proofing. The hexagonal cell honeycomb structure body 1 with the water-proofing or moisture-proofing is immersed in water. A hydrostatic pressure is applied to the hexagonal cell honeycomb structure body 1 in water so as to measure the pressure when the hexagonal cells in the hexagonal cell honeycomb structure body 1 are broken. This broken pressure is the isostatic strength (Mpa).

In FIG. 6, the hexagonal cell honeycomb structure bodies having the minimum radius of curvature within the range of 0 mm to 0.15 mm correspond to the related art hexagonal cell honeycomb structure body because the related art has no R-shaped corner parts whose minimum radius of curvature is a range of 0 mm to 0.15 mm at most. On the contrary, the hexagonal cell honeycomb structure bodies 1 according to the embodiment have the R-shaped corner parts 20 whose minimum radius of curvature is within the range of approximately 0.25 mm to 0.45 mm As has clearly shown in FIG. 6, the hexagonal cell honeycomb structure bodies 1 of the embodiment have the superior isostatic strength when compared with the hexagonal cell honeycomb structure bodies of the related art. In particular, in the range of 0.25 mm to 0.45 mm of the minimum radius of curvature of the R-shaped corner part, the isostatic strength of the hexagonalc ecell honeycomb structure body 1 of the embodiment becomes approximately three to five times when compared with the related art. This exceeds the sufficient isostatic strength required under the condition close to the actual use.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalent thereof.

What is claimed is:

1. A hexagonal cell honeycomb structure body comprising a plurality of hexagonal cells formed in a lattice arrangement, each hexagonal cell surrounded by cell walls composed of six sides arranged in a hexagonal lattice shape, wherein a R-shaped corner part of an approximate circular-arc shape is alternately formed at interior angle parts of the cell walls forming each hexagonal cell in view of a cross section of the hexagonal cell perpendicular to an axis direction of the hexagonal cell honeycomb structure body, and a radius of curvature of each R-shaped corner part is larger than a radius of curvature of another corner part at which the R-shaped corner part is not formed, and wherein the minimum radius of curvature of the R-shaped corner part is within a range of 0.25 mm to 0.45 mm.

2. The hexagonal cell honeycomb structure body according to claim 1, wherein a thickness of each cell wall is within a range of 70 μm to 130 μm.

3. The hexagonal cell honeycomb structure body according to claim 1, wherein a thickness of each cell wall is within a range of 70 μm to 130 μm.

4. The hexagonal cell honeycomb structure body according to claim 1, wherein the hexagonal cell honeycomb structure body is made of ceramics composed mainly of cordierite, and a thickness of each cell wall is 90 μm.

5. A hexagonal cell honeycomb structure body comprising a plurality of hexagonal cells formed in a lattice arrangement, each hexagonal cell surrounded by cell walls composed of six sides arranged in a hexagonal lattice shape, wherein a R-shaped corner part of an approximate circular-arc shape is alternately formed at interior angle parts of the cell walls forming each hexagonal cell in view of a cross section of the hexagonal cell perpendicular to an axis direction of the hexagonal cell honeycomb structure body, and a radius of curvature of each R-shaped corner part is larger than a radius of curvature of another corner part at which the R-shaped corner part is not formed, wherein a minimum radius of curvature of the R-shaped corner part is within a range of 2.8 times to 5 times of a thickness of each cell wall, and wherein the minimum radius of curvature of the R-shaped corner part is within a range of 0.25 mm to 0.45 mm.

6. The hexagonal cell honeycomb structure body according to claim 5, wherein a thickness of each cell wall is within a range of 70 μm to 130 μm.

7. The hexagonal cell honeycomb structure body according to claim 5, wherein the hexagonal cell honeycomb structure body is made of ceramics composed mainly of cordierite, and a thickness of each cell wall is 90 μm.

* * * * *